Feb. 8, 1949.  R. J. GAMBLE  2,461,049

BICYCLE PEDAL

Filed Oct. 30, 1947

INVENTOR.
ROBERT J. GAMBLE
BY Ralph W. Brown
ATTORNEY

Patented Feb. 8, 1949

2,461,049

UNITED STATES PATENT OFFICE 2,461,049

BICYCLE PEDAL

Robert J. Gamble, Milwaukee, Wis.

Application October 30, 1947, Serial No. 783,073

4 Claims. (Cl. 74—594.4)

This invention relates to pedals for bicycles and the like and particularly for children's vehicles of that type.

Standard pedals are commonly two sided only. More particularly such pedals generally comprise two laterally spaced elongated blocks of rubber or the like disposed at diametrically opposite sides of the pedal spindle, where they cooperate to define two oppositely directed tread surfaces closely spaced at opposite sides of the pedal axis. For small children such pedals are troublesome, because of their inability to properly coordinate their feet with the tread surfaces of the pedals. Although four-sided pedals have been proposed as a solution to this difficulty none heretofore designed have proven entirely satisfactory.

One object of the present invention is to provide an improved four-sided pedal of simple inexpensive construction.

Another object is to provide a replacement unit by which a conventional two-sided pedal may be readily converted into a four-sided pedal.

Other objects and advantages will appear, expressed or implied, from the following description of a pedal constructed in accordance with the present invention.

Figure 1:
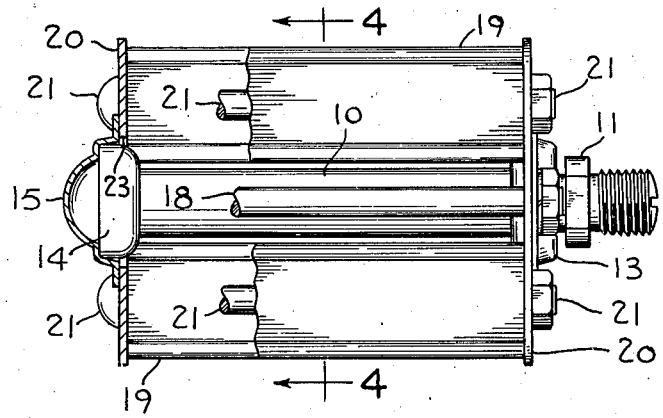
Figure 1 is a view in side elevation, partly in section, of a pedal embodying the present invention.
Figure 2:
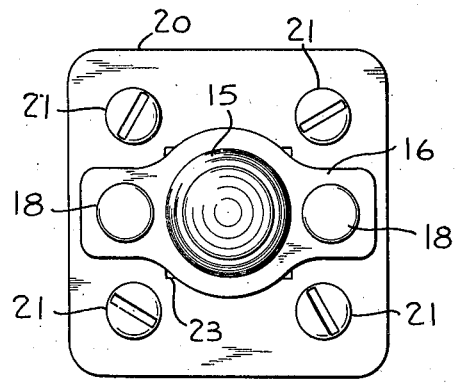
Figs. 2 and 3 are end elevations showing opposite ends of the pedal.
Figure 3:
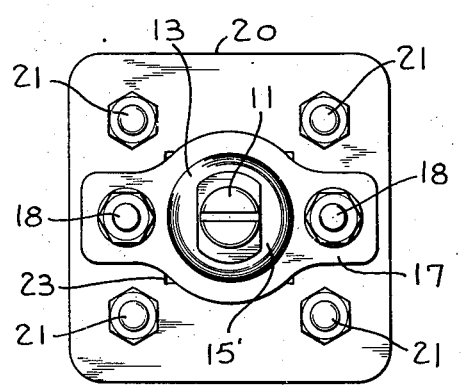
Figure 4:
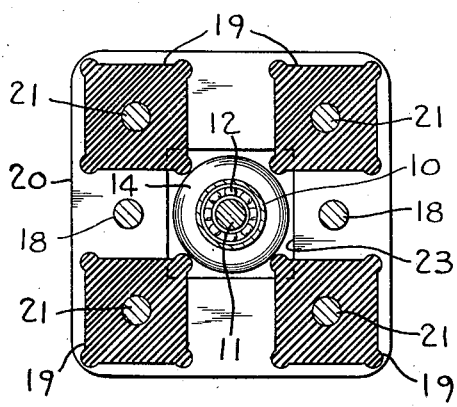
Fig. 4 is a transverse sectional view taken substantially along the line 4—4 of Fig. 1.

The pedal selected for illustration utilizes the frame structure of a conventional two-sided pedal, the frame structure including a central tube 10 through which a standard pedal spindle 11 projects and within which the spindle 11 is journalled by conventional bearings 12 disposed at opposite ends thereof. One of the bearings is concealed within an enlargement 13 at the inner end of the tube 10, while the other is concealed in a hood 14 at the outer end of the tube 10, the hood 14 being closed by a removable cap 15.

As is customary in pedals of this kind the cap 15 comprises a central integral part of a cross-arm 16, and a similar portion 15' of the enlargment 13 constitutes a central integral part of a cross-arm 17. Corresponding ends of the arms 16 and 17 are releasably connected by longitudinal tie bolts 18 extending parallel to and at diametrically opposite sides of the tube 10 to complete the frame. In standard two-sided pedals the bolts 18 also function as individual supports for a pair of rubber tread blocks, each extending lengthwise through one of the blocks.

In the pedal shown however the usual pair of tread blocks have been replaced by four tread blocks 19 of like design symmetrically disposed about the central tube 10. In this instance the four tread blocks 19 are shown confined between a pair of end plates 20, each being mounted on a tie bolt 21 extending therethrough and connecting the end plates 20 to form a self sustaining unit such as shown particularly in Fig. 5. It will be noted that in this unit the tread blocks 19 are disposed in a manner to provide four tread surfaces equally spaced from the central axis of the unit, each block 19 cooperating with adjacent blocks to define two tread surfaces disposed at right angles to each other.

Both end plates 20 are perforated, as at 22, to receive the tie bolts 18 by which they may be secured to the cross-arms 16 and 17, in a manner to rigidly unite them and the tread blocks 19 with the standard pedal frame, as indicated in Figs. 1 to 4.

Figure 5:
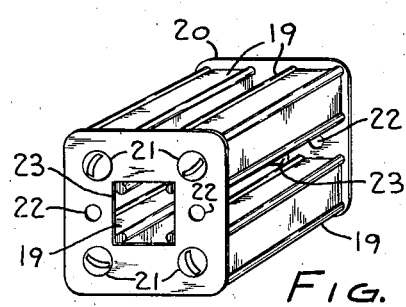
Fig. 5 is a perspective view of a replacement unit by which a conventional two-sided pedal may be readily converted into the four-sided pedal shown in the other views.

It will thus be noted that the replacement unit shown in Fig. 5 may be utilized to readily convert a standard two-sided pedal into a four-sided pedal. To do so the tie bolts 18 are first released to permit withdrawal of the outer cross-arm 16, with the cap 15, and to permit removal of the original tread blocks from these bolts. The unit of Fig. 5 is then passed lengthwise over the tube 10 until engaged with the inner cross-arm 17, whereupon the bolts 18, projecting from the released cross-arm 16, are threaded through both end plates 20 and anchored in the inner cross-arm 17 to thus rigidly secure the parts in assembled relation. It is of course understood that central openings 23 in the end plates 20 are of a size to clear the enlargement 13 and hood 14 when passing the unit over the tube 10 in the manner above described.

Various changes may be made in the embodiment of the invention hereinabove described without departing from or sacrificing the advantages of the invention as defined in the appended claims.

I claim:

1. A pedal for bicycles and the like comprising a central longitudinal tube, a pair of parallel cross-arms carried by the opposite ends of said tube, a pair of end plates, four elongated tread blocks extending between said end plates, and a pair of tie bolts releasably connecting the ends of said cross-arms for rigidly uniting said end plates and tread blocks with said cross-arms.

2. A pedal for bicycles and the like comprising a main frame, including a pair of parallel cross-arms and an elongated supporting member extending therebetween, an auxiliary frame, including a pair of end plates attached to and carried by said cross-arms, and four elongated tread blocks extending between said end plates, said tread blocks being disposed parallel to said supporting member and symmetrically disposed about the same.

3. A pedal for bicycles and the like comprising a main frame, including a pair of parallel cross-arms and an elongated supporting member extending therebetween, an auxiliary frame, including a pair of end plates, four elongated tread blocks extending between said end plates, and bolts extending through said tread blocks and end plates to form a rigid unit, and bolts extending through said cross-arms and through said end plates for securing said auxiliary frame to said main frame.

4. A replacement unit for converting a two-sided pedal into a four-sided pedal, said unit comprising a pair of end plates, four symmetrically disposed tread blocks extending between said end plates, and bolts extending lengthwise through said tread blocks and through said end plates to form a rigid unit.

ROBERT J. GAMBLE.

REFERENCES CITED

The following references are of record in the file of this patent:

UNITED STATES PATENTS

| Number | Name | Date |
|---|---|---|
| 1,972,701 | Carlson et al. | Sept. 4, 1934 |